3,772,433
TREATMENT OF HEPATOPATHIAS WITH SACCHARIDES
Johannes Bircher, Bern-Spiegel, Switzerland, and Rudolf Weidenhagen, Ulversheim uber Mainz, Hans Reinicke, Mannheim, Senta Leonhauser, Iivesheim, and Ingeborg Bauer, Karlsruhe-Waldstadt, Germany, assignors to Suddeutsche Zucker Aktiengesellschaft, Mannheim, Germany, and Laevosan Gesellschaft mbH & Co. KG, Linz, Austria, fractional part interest to each
Filed Dec. 23, 1970, Ser. No. 100,994
Claims priority, application Germany, July 7, 1970,
P 20 33 677.0
Int. Cl. A61k 27/00
U.S. Cl. 424—180                                 4 Claims

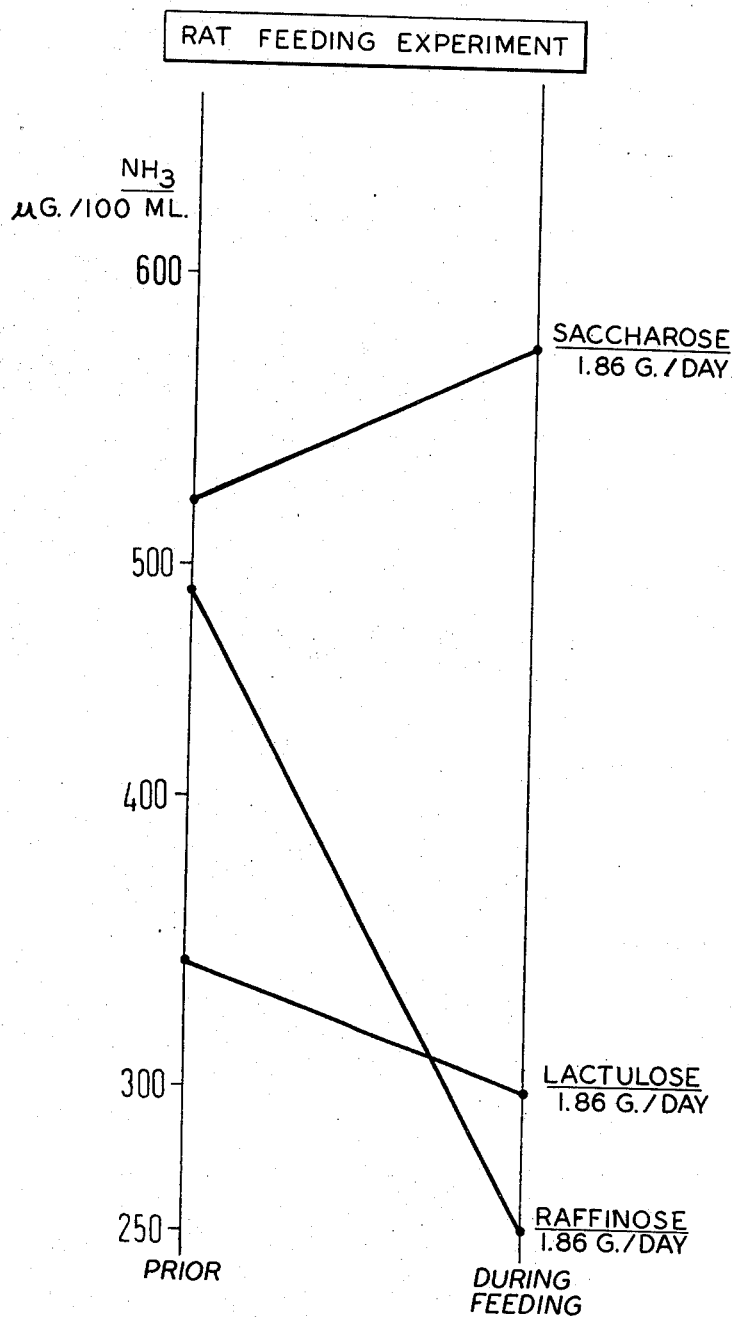

ABSTRACT OF THE DISCLOSURE

Pharmaceutical compositions comprising at least one of the following substances:

(a) a saccharide of the general formula:

$$(gal)_n\text{-saccharose,}$$

in which gal is a gelactose residue; and $n$ is an integer of 1 or higher; ,
(b) a oligofructosan;
(c) a polyfructosan;
(d) a kestose.

are outstandingly useful for the treatment and prophylaxis of hepatopathias, dyspepsias, dysbioses and nutritional disturances of unweaned infants and related symptoms.

---

The present invention is concerned with a pharmaceutical composition which is especially suitable for the treatment and prophylaxis of hepatopathias, dyspepsias, dysbioses and nutritional disturbances of unweaned infants, as well as phenomena resulting therefrom.

Hepatopathias, especially chronic hepatopathias and, in particular, hepatic encephalopathias, are diseases which have hitherto not been satisfactorily susceptible to medicinal therapy. In many cases, the known pharmaceuticals were ineffective and, furthermore, the use of some of them involved certain risks because of their not inconsiderable toxicity. It has already been found that lactulose has some effect against such disease but, nevertheless, its use induces certain undersirable side effects.

The present invention provides compositions where administration effectively combats these diseases, without producing significant undesirable side effects or involving risks with respect to toxicity.

The pharmaceutical compositions according to the present invention, which are especially useful for the treatment and prophylaxis of hepatopathias and nutritional disturbances of unweaned infants, is characterized by a content of at least one of the following substances:

(a) a saccharide of the general formula:

$$(gal)_n\text{saccharose,}$$

in which gal is galactose residue; and $n$ is an integer of 1 or higher;
(b) a oligofructosan;
(c) a polyfructosan;
(d) a kestose.

The pharmaceutical composition according to the present invention preferably contains raffinose and/or inulin as an active component. Further, examples of sugars of the above-mentioned groups which can also be used include 1-kestose, 6-kestose and neokestose.

The active materials of the pharmaceutical compositions according to the present invention possess, surprisingly an outstanding pharmacological effectiveness. This effectiveness consists in a healing and prophylactic action in the case of hepatopathias, especially chronic hepatopathias and, in particular, hepatic encephalopathias, dyspepsias, dysbioses, as well as nutritional disturbances in unweaned infants, infantile dyspepsias and the like, as well as their resultant phenomena. Especially good results have been obtained in clinical investigations in the case of chronic coma hepaticum, in the case of alcoholic liver cirrhosis and in the case of hepatic encephalopathy.

The actual mode of action of the pharmaceutical composition according to the present invention is not precisely known. However, a common characteristic of the active materials contained in the pharmaceutical compositions according to the present invention is that they reach the colon without having been split and can there be broken down by microorganisms. Since the active materials in question are saccharides with β-fructosidic components and in some cases, are β-fructofuranose derivatives, then a breakdown must take place by microbial β-fructosidase which, in the case of, for example raffinose, results in the formation of fructose and melibiose. By the further decompositon of these products, there are probably formed organic acids, especially lactic acid, which result in an observed reduction of the pH value of the colon. The lowering of the pH value in turn leads to an inhibition of the activity of the flora responsible for the formation of toxic proteinaceous decomposition products. These toxic proteinaceous decomposition products, such as ammonia and phenolic bodies and the like, participate in the appearance of the diseases which can be combatted and prevented by the pharmaceutical compositions according to the present invention.

In the case of suckling infants, still another mode of action comes into consideration since exhibit an inherent microbial a-gelactosidase (Bifidus type IV) activity so that in addition to the above-mentioned decomposition to fructose and melibiose, there also occurs a decomposition to saccharose and galactose (Bifidus 4-flora).

The pharmaceutical composition according to the present invention is especially suitable for oral or rectal administration and can be administered in any formulation suitable for the selected route. Administration can be in pure form or together with conventional solid or liquid pharmaceutical carriers and excipients. Examples of forms of administration which can be used include powders, crystalline materials, instant powders, tablets, granulates, effervescent tablets, capsules, dragees, syrups, pastes, gums and the like.

If desired, the active materials to be used according to the present invention can be admixed with other therapeutically active agents, for example, with antibiotics, sulfonamides and vitamins. In addition, flavoring agents can also be added. Furthermore, in the case of unchanged indications of the patient, they can also be worked up to or contained in foodstuffs, especially dietetic foodstuffs and foodstuffs for sucklings and children.

Since the active substances of the pharmaceutical compositions according to the present invention are, in reasonable doses, non-toxic, the dosages administered can be determined almost as desired, depending on the particular requirements of the patient. In actual fact, there are normally used daily dosages of between 20 and 250 grams, spread in small amounts over the course of the day. The upper limit of the amount administered is normally determined by a slight laxative effect which occurs when the dosage administered is too high but the effective threshold is an individual characteristic which can easily be ascertained.

The pharmaceutical composition according to the present invention provides considerable advantages in comparison with the previously known pharmaceutical compositions of the same effectiveness. Thus, in comparison with the disaccharide lactulose, there is the advantage that the active materials of the pharmaceutical compositions according to the present invention (tri- and polysaccharides) are much less sweet and, therefore, are less objectionable to patients especially in cases where prolonged administration is indicated. It is also to be borne in mind that lactulose exerts an osmotic action in the intestinal tract which can manifest itself in anything from a slight laxative action to a marked diarrhea: however, actions of this nature are much less marked in the case of the use of the active materials in the pharmaceutical compositions according to the present invention.

Furthermore, the active materials in the pharmaceutical compositions according to the present invention are not reducing sugars, as is lactulose; they are not hygroscopic; they are less sensitive to alkalis than lactulose (no yellow coloration); they can be readily crystallized and can easily be obtained in a pure state. Furthermore, the active materials used according to the present invention are naturally-occurring materials, whereas lactulose is not.

In comparison with other pharmaceuticals with corresponding effectiveness, especially neomycin, we have found that the pharmaceutical composition according to the present invention is also effective in those cases in which neomycin is ineffective. Furthermore, the active materials used according to the present invention have a considerably lower toxicity and fewer side effects than, for example, neomycin, the use of which involves not inconsiderable risks.

The following examples are given for the purpose of illustrating the present invention, but are not to be construed as limitative thereof.

Example 1.—Use of raffinose in clinical coma therapy

A 64-year old patient with chronic coma hepaticum due to alcoholic liver cirrhosis was given 150 grams raffinose daily per os. With a constant diet (40 grams protein daily), an initially good response was observed. The coma could be overcome in a way which was just as good as with neomycin therapy. Without the therapy, a relapse occurred, which could, however, still be controlled again by raffinose. EEG-observations confirmed the clinical course of the treatment.

This clinical investigation showed that raffinose possesses favorable activity in the case of porto-systemic encephalopathy.

Example 2

An elderly hospitalized patient with non-characteristic abdominal pains was given barium sulfate for 3 days. On the fourth day, an X-ray was taken of the empty abdomen from a rear posture, whereafter 20 grams raffinose were administered. Thereafter, the same amounts of raffinose were administered every 30 minutes for a total period of 180 minutes. The calculation of the colonic volume from the X-rays gave a maximum volume increase of 400 ml.

Example 3.—Reduction of the ammonia level in rats with a porto-caval shunt

After application of a porto-caval shunt, rats showed a hyperammonaemia which, in the course of time, increased from a normal value of about 100 µg./100 ml. to 600 µg./100 ml.

For the treatment, 0.6 grams raffinose was administered to the animals three times daily for 48 hours by means of a stomach probe. An identical amount of lactulose and of saccharose was administered to two control groups. The ammonia level was determined before and after the experiments. The results obtained are set out graphically in the accompanying drawing. They clearly show the superiority of the action of the raffinose in comparison with the also favorable action of lactulose, whereas, in the case of saccharose, a negative effect occurred. This means that the ammonia level sinks the most markedly in the case of the administration of raffinose.

Example 4.—Effectiveness of inulin in hepatic encephalopathy

In a clinical investigation, inulin was administered to a patient with hepatic encephalopathy at a dosage rate which increased from 500 to 200 grams per day. A marked improvement of the condition of the patient was observed. Whereas before the treatment, the writing test and matchstick test were negative, after administration of the inulin, a clearly positive reaction occurred in both cases. At the same time, the ammonia level in the blood dropped.

Example 5.—Rectal administration

A 47-year old male patient with hepatic coma, stage III, was given a total of 1000 ml. of a 15% aqueous solution of raffinose, the pH of which was buffered, divided into three doses over the course of the day, administration at a rapid rate being by means of a balloon catheter. After the treatment had been carried out, there was observed an improvement of consciousness, an improvement of the EKG, and a reduction of the venous and arterial ammonia level. Further treatment was by the oral administration of raffinose.

Example 6

Administration of raffinose in doses of 20–150 grams daily, especially of 40–60 grams and advantageously of 46 grams, raffinose in 4 tablets (4 individual doses) were spread out over the day. A single dose corresponds to 11.5 grams raffinose.

Example 7.—Formulation of the tablets according to Example 6

|  | Grams |
|---|---|
| Raffinose | 11.5 |
| Polyglycol type 1500 | 0.523 |
| Lemon flavoring | 0.0125 |
| Citric acid | 0.1575 |
| Talc | 0.5 |

Example 8.—Formulation of a raffinose granulate 100 grams raffinose were granulated with 10% starch paste and colored with 0.2 mg. percent (i.e., 0.2 mg. per 100 grams granulate mass) tartrazine yellow.

It will be understood that the foregoing specification and examples are illustrative and not limitative of the present invention in that many other embodiments of the invention will suggest themselves to those skilled in the art.

What is claimed is:

1. Method for the treatment of hepatopathias, disturbances, dysepsias, dysbioses and nutritional disturbances which method comprises administering enterally to the subject an effective amount of at least one of the following substances:
   (a) raffinose;
   (b) an oligofructosan;
   (c) a polyfructosan;
   (d) a kestose.

2. Method as claimed in claim 1 wherein the substance is inulin.

3. Method as claimed in claim 1 wherein said substance is raffinose and said raffinose is applied at a dosage of about 100 grams per day.

4. Pharmaceutical composition in dosage unit form for the treatment of hepatopathias, dysepsias, dysbioses and nutritional disturbances which composition comprises inulin, an effective amount, and a pharmaceutically acceptable carrier, in a form adapted for anteral administration.

References Cited

Chemical Abstracts, Vol. 44, entries 8556g—8557c, 1950, copy in POSL.

Chemical Abstracts, Vol. 67, entries 1194m—62227w, 1967, copy in POSL.

Chemical Abstracts, Vol. 69, entry 95213h, 1968, copy in POSL.

RICHARD L. HUFF, Primary Examiner